UNITED STATES PATENT OFFICE.

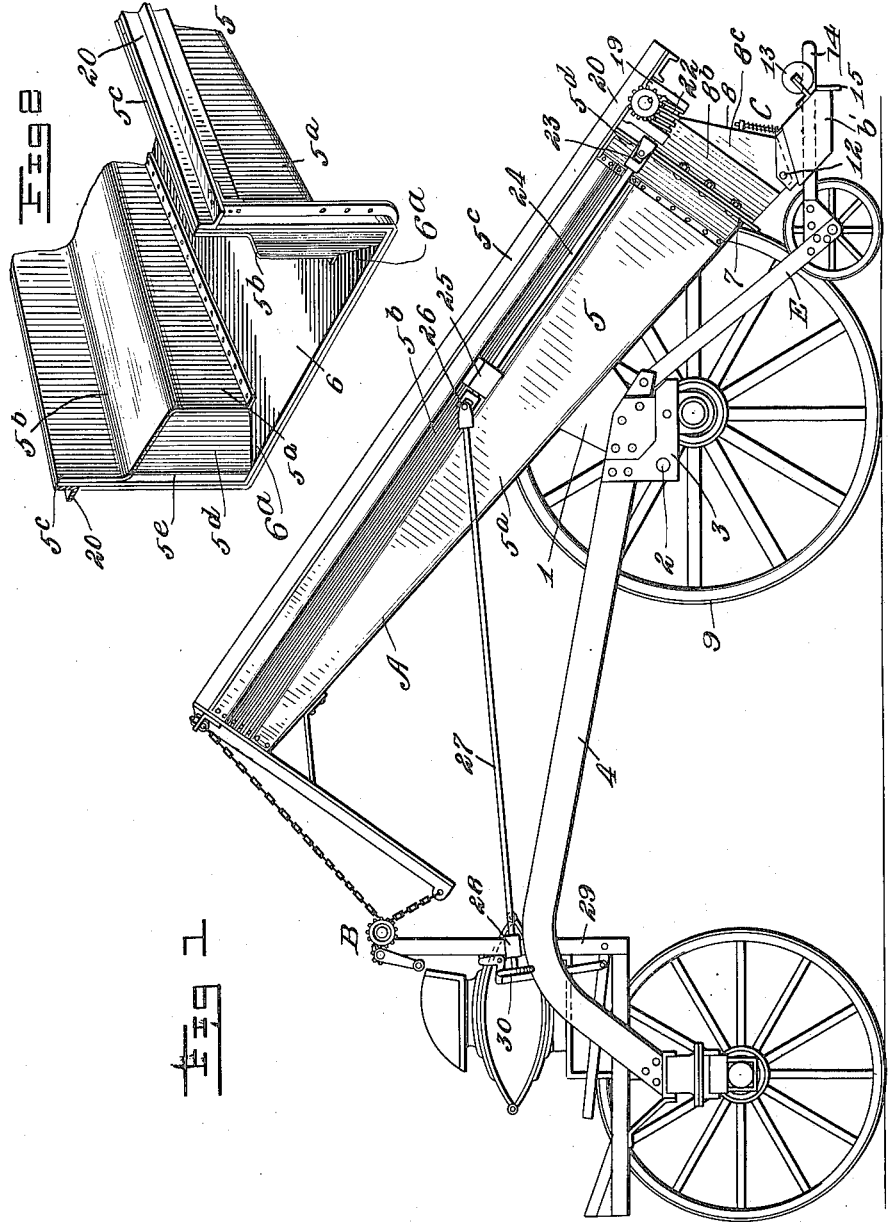

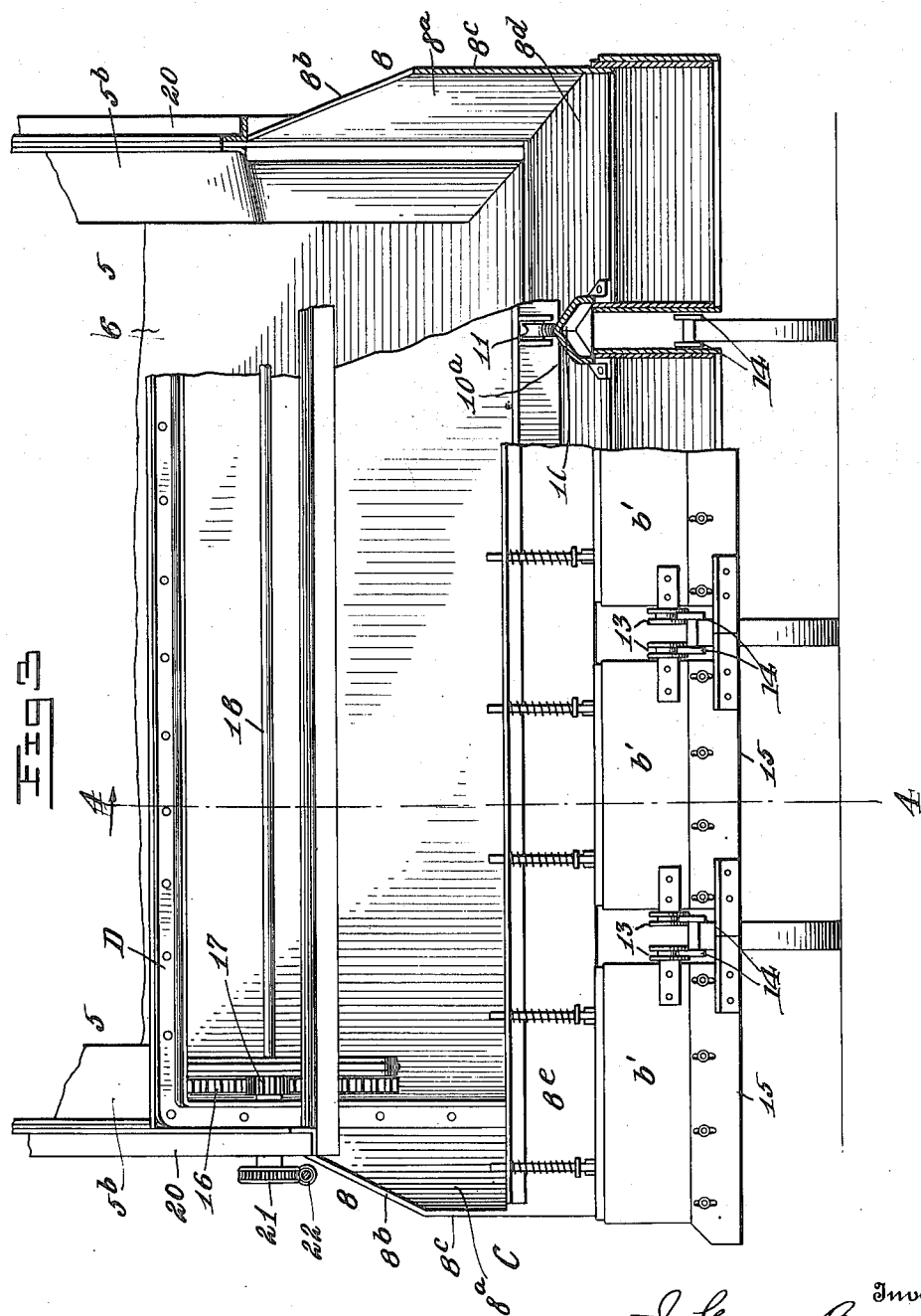

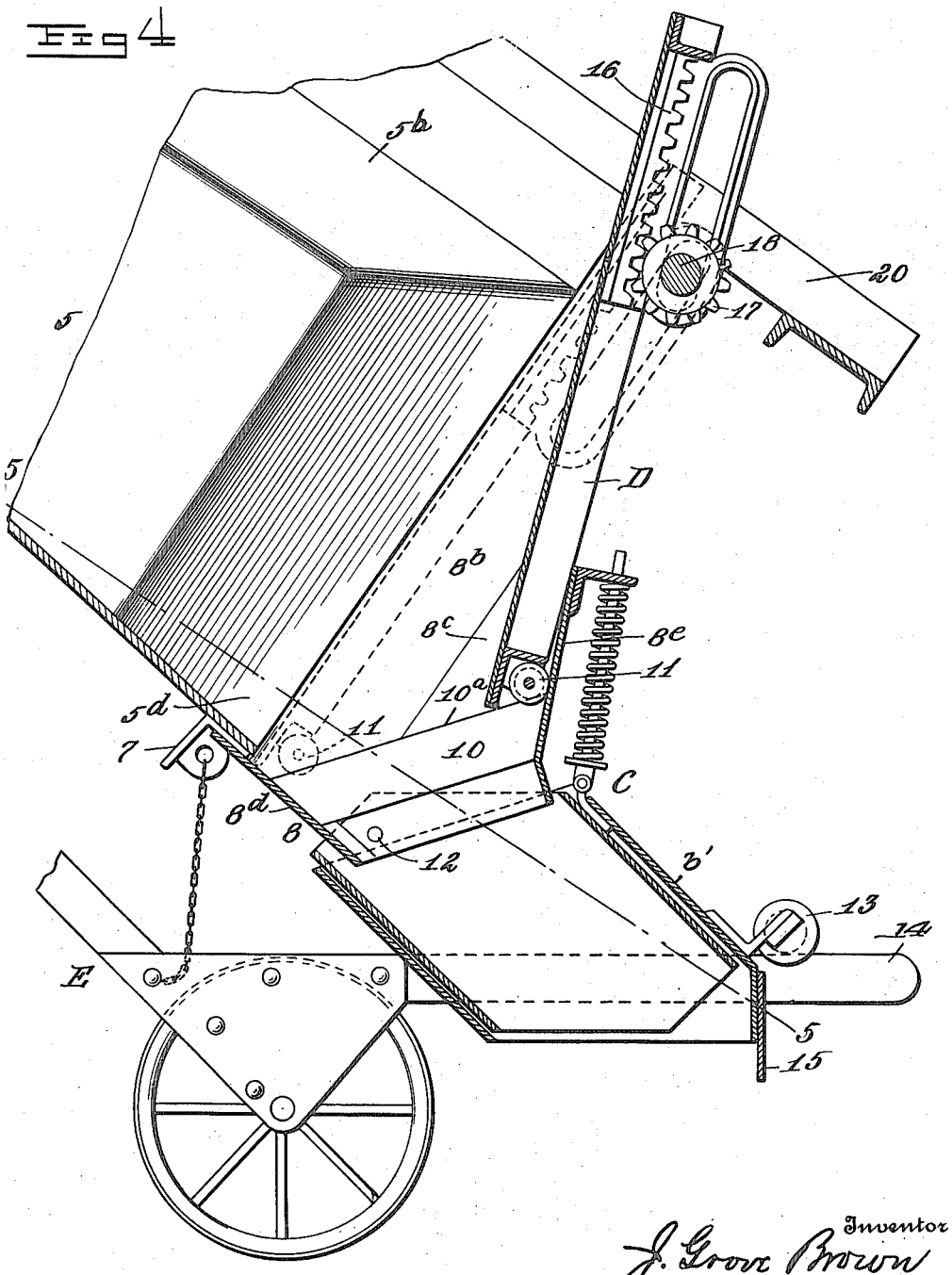

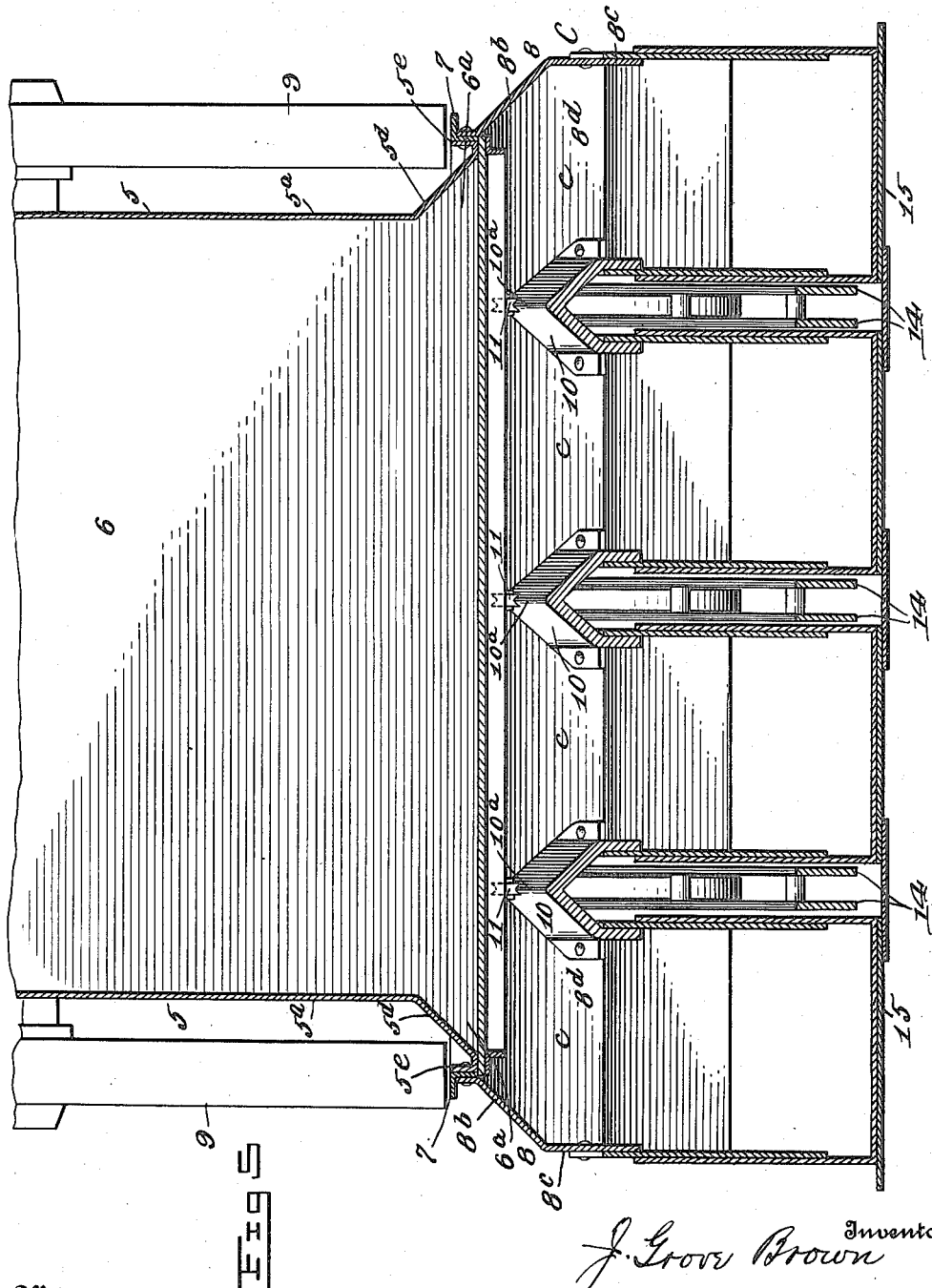

J. GROVE BROWN, OF GROTON, NEW YORK.

CHUTE-WAGON.

1,221,281.   Specification of Letters Patent.   Patented Apr. 3, 1917.

Application filed September 22, 1914. Serial No. 862,957.

*To all whom it may concern:*

Be it known that I, J. GROVE BROWN, a citizen of the United States, residing at Groton, in the county of Tompkins and State of New York, have invented certain new and useful Improvements in Chute-Wagons, of which the following is a specification.

This invention relates to improvements in vehicles and vehicle attachments for spreading road-making material upon roadways. In my prior application, Serial No. 796,436, filed Oct. 21, 1913, I have shown a vehicle with chute attachments for delivering crushed stone evenly in layers of various widths and depths as the load is dumped from the vehicle. The present improvements relate to vehicles and chute attachments for the same purpose, the vehicle body being arranged so that the rear portion thereof becomes practically a part of the chute attachment, which facilitates the delivery of the material at the sides of the wagon body, the whole arrangement being such that the chute attachment itself may be shorter than the attachment disclosed in the above mentioned application. Furthermore, certain partitions are dispensed with in the present application, and the arrangement of the gate for discharging the material is improved upon.

The details and advantages of my invention will be clear from the following specification taken in connection with the accompanying drawings, in which, Figure 1 is a side elevation of the chute wagon, with the wagon body in dumping position;

Fig. 2 is a perspective view of the rear end of the wagon body;

Fig. 3 is a rear elevation, partly broken away, of the rear end of the wagon and the chute attachments in dumping position;

Fig. 4 is a section on the line 4—4 of Fig. 3, the gate being shown in open position; and, Fig. 5 is a section on the line 5—5 of Fig. 4, showing the gate closed.

Referring to the drawings, A indicates a wagon body, which is provided with depending legs 1, pivoted upon a bar 2 in brackets 3 suspended from the frame 4. Suitable hoisting and lowering mechanism B is provided at the forward end of the vehicle, for tilting the body about its axis into and out of the dumping position.

In order to facilitate shoveling the material into the wagon, the sides 5 of the body are made comparatively low, and to compensate in carrying capacity for this reduction in height of the sides, the sides are, in their upper portions, flared upwardly and outwardly over the wheels. Thus, the sides rise vertically, as shown at $5^a$, from the bottom 6, then flare outwardly and upwardly, as indicated at $5^b$, and then rise vertically in the planes of the wheels 9, as indicated at $5^c$. The central and lower portions of the sides flare outwardly and rearwardly at their rear ends, as indicated at $5^d$, and are thence turned forwardly as shown at $5^e$, (Fig. 5) in the planes of the upper parts $5^c$ of the sides. The rear end of the bottom 6 flares outwardly in conformity with the rearward and outward flare of the sides, as shown at $6^a$. An angle bar 7 is secured to the sides of the body, at their rear ends, and extends beneath the bottom, this bar serving as a strengthening means for the end of the body, and also as a convenient part to which chute attachments may be detachably and interchangeably connected. The rearwardly flaring or enlarging portion of the end of the body, just described, constitutes, in fact, part of a chute, and its purpose is to allow the material being dumped to spread freely at the sides into a detachable chute attachment, such as is shown at C.

The chute attachment shown in the drawing comprises a main chute 8 having substantially triangular sides $8^a$, which are bolted to the angle bar 7 and flare outwardly and rearwardly, in opposite directions, as shown at $8^b$, beyond the planes of the rear wheels of the wagon, and then extend rearwardly in parallel planes, as shown at $8^c$. The bottom $8^d$ of the chute extends rearwardly, parallel with the bottom of the wagon, and the rear side $8^e$ of the chute slopes upwardly and forwardly from its outlet end for about half the height of the sides of the wagon body. A gate D, hereinafter referred to, constitutes the closure for the rear of the chute above the part $8^e$.

This main chute is divided near its outlet into a plurality of smaller chutes $c$ by partitions 10, which extend from the bottom wall $8^d$ upwardly and rearwardly to the wall $8^e$. These dividing partitions are castings, of inverted V-shape in cross section, with central ridges $10^a$ which form guiding rails for rollers 11 on the bottom of the end gate D.

Attached to these partitions and to the sides of the main chute by pivotal connections 12 are independently movable and extensible chutes $b'$, which constitute the delivery ends of the chutes or compartments $c$.

These delivery ends $b'$ are substantially the same as those described in my earlier copending application, Serial No. 796,436, above referred to, and need not be particularly described here. They are also mounted the same as shown in said application, the delivery ends being provided with rollers 13, resting upon rails 14 of independently movable gage members E, which latter trail behind the vehicle and support the delivery ends, and the scrapers 15 thereon, at predetermined heights above the roadway.

Gate D is a swinging and sliding gate, provided at its lower end with the rollers 11 which ride upon the partitions 10 aforesaid, and provided at its upper end with vertically arranged racks 16 near its opposite sides, which racks are engaged by pinions 17, secured to a shaft 18, which shaft is journaled in suitable bearing blocks 19, carried by angle bars 20, which extend along the top edges of the wagon sides and project a short distance to the rear of the sides. One of these bearing blocks is shown in Fig. 1, and it will be understood that a similar bearing block is arranged beneath the opposite angle bar 20. The shaft 18 and the bearings thereon are rotatable by means of a worm wheel 21 on the shaft and a worm 22, journaled in a bearing block and connected by a universal joint 23 with a shaft section 24 extending along the side of the wagon body, through a bearing 25 and connected by a universal joint 26 to a shaft section 27, which latter section extends through a bearing 28 upon an upright 29 near the driver's seat. The shaft section 27 is provided with a hand wheel 30, by means of which the two sections of the shaft and the worm may be turned to raise and lower the gate from the driver's seat. The shaft section 27 is slidably, as well as rotatably, mounted in the bearing 28, and by reason of the universal joint 26, it will be evident that the shaft section 27 will accommodate itself to any position of the body.

The operation of the gate is illustrated in Fig. 4 wherein the gate is shown in open position in full lines, and in closed position in dotted lines. It will be evident that as the worm gearing turns the shaft 18 in one direction, if the body is tilted and loaded with material, the gate will be gradually raised by the rack and pinion, and the lower end of the gate will ride out on the rails or ways $10^a$. The gate may be held stationary in any intermediate position, as the load bearing against it will not cause the worm to turn, and the lower end of the gate will be prevented from sliding backward by reason of the inclination of the guide rails on which it rests. When the load has been distributed and the wagon body is returned to its normal position, the operation of the worm gearing to lower the gate will force the rollers 11 down to the lower ends of the rails on which they rest, as shown in dotted lines in Fig. 4, and in this position it will be evident that the lower end of the gate will be forced tightly against the rear end of the wagon body.

In the apparatus shown in my prior application, above referred to, the chute attachment is shown attached to a wagon body of ordinary width and provision is made, entirely within the attachment, for spreading the material across the path of the vehicle and also laterally at the sides thereof. This requires extended dividing partitions in the chute attachment, arranged at different angles, and for this reason, as well as because of the mounting of the end gate, which, in said application, has a swinging movement only, the chute attachment is necessarily longer than the attachment in the present application, and requires that the wagon body be supported at a higher point above the ground. The present arrangement avoids the necessity of having the angular partitions and permits of the shortening of the chute attachment and lowering of the body, which latter feature facilitates loading.

What I claim is:

1. In a chute wagon, a body having its sides flaring outwardly at their rear ends, a chute secured to the body and having its sides flaring outwardly from the ends of the body sides, and a gate extending across the rear end of the body and fitting against the rear ends of its sides.

2. In a chute wagon, a body having its sides flaring outwardly at their rear ends, a chute secured to the body and having its sides flaring rearwardly and outwardly from the rear ends of the body sides, a sliding and swinging gate extending across the rear end of the body, and a rearwardly extending supporting rail for the lower end of the gate arranged within the chute.

3. In a chute wagon, a body having its sides flaring outwardly at their rear ends, a chute secured to the body and having its sides flaring outwardly from the ends of the body sides, a swinging and sliding gate extending across the rear end of the body, and a supporting rail for the lower end of the gate arranged within the chute and inclined upwardly and rearwardly with respect to the floor of the body.

4. In a chute wagon, a body having its sides flaring outwardly at their rear ends, a chute secured to the body and having its sides flaring outwardly from the ends of the body sides, a sliding and swinging gate extending across the rear end of the body, and a plurality of partitions in the chute inclined upwardly and rearwardly with respect to the floor of the body and forming guide rails for the lower end of the gate.

5. In a chute wagon, a body having its sides flaring outwardly at their rear ends and thence turned forwardly, an angle bar secured to said forwardly turned parts and extending around the sides and floor of the body, a chute detachably connected to said angle bar, and a gate extending across the rear end of the body and adapted to fit against the outwardly flaring ends of its sides.

6. In a chute wagon, a sliding and swinging gate at the rear of the wagon body, a chute projecting from the rear of the body, and an upwardly and rearwardly extending supporting rail in said chute adapted to support the lower end of the gate.

7. In a chute wagon, a sliding and swinging gate at the rear of the wagon body, a chute projecting from the rear of the body, and a plurality of partitions in the chute inclined upwardly and rearwardly with respect to the floor of the body and forming guide rails for the lower end of the gate.

In testimony whereof I have affixed my signature, in presence of two witnesses.

J. GROVE BROWN.

Witnesses:
  FRED. C. ATWATER,
  WILLIAM H. ROBINSON.